(12) United States Patent
 Sun

(10) Patent No.: US 10,019,036 B2
(45) Date of Patent: Jul. 10, 2018

(54) FLEXIBLE DISPLAY DEVICE

(71) Applicant: BOE Technology Group Co., Ltd., Beijing (CN)

(72) Inventor: Yanliu Sun, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/511,352

(22) PCT Filed: Mar. 16, 2016

(86) PCT No.: PCT/CN2016/076473
§ 371 (c)(1),
(2) Date: Mar. 15, 2017

(87) PCT Pub. No.: WO2016/165519
PCT Pub. Date: Oct. 20, 2016

(65) Prior Publication Data
US 2017/0285688 A1    Oct. 5, 2017

(30) Foreign Application Priority Data

Apr. 13, 2015    (CN) .......................... 2015 1 0172927

(51) Int. Cl.
*G06F 1/16* (2006.01)
*H05K 5/00* (2006.01)
*H05K 7/00* (2006.01)

(52) U.S. Cl.
CPC .......... *G06F 1/1652* (2013.01); *G06F 1/1643* (2013.01); *G06F 1/1681* (2013.01)

(58) Field of Classification Search
CPC .... G06F 1/1652; G06F 1/1643; G06F 1/1681; H05K 5/0226; H05K 5/0017
(Continued)

(56) References Cited

U.S. PATENT DOCUMENTS 8,654,519 B2    2/2014  Visser et al.
9,337,434 B2 *  5/2016  Lindblad ................. H01L 51/52
(Continued)

FOREIGN PATENT DOCUMENTS

| CN | 101952873 A | 1/2011 |
| CN | 104424844 A | 3/2015 |
| CN | 104714699 A | 6/2015 |

OTHER PUBLICATIONS

Second Office Action from Chinese Patent Application No. 201510172927.8, dated Aug. 9, 2017, 12 pages.
(Continued)

*Primary Examiner* — Anthony Haughton
(74) *Attorney, Agent, or Firm* — Westman, Champlin & Koehler, P.A.

(57) ABSTRACT

A flexible display device is disclosed. The flexible display device includes a flexible display screen, the flexible display device further includes a supporting structure configured for supporting the flexible display screen, and the flexible display screen is fixedly connected with the supporting structure and fixed on a supporting surface of the supporting structure. The supporting surface of the supporting structure is allowed to be selectively transformed into a planar surface or a curved surface. With the flexible display device, touch control and click operations performed on the flexible display screen may be facilitated, and thus application field of the flexible display screen may be expanded.

10 Claims, 2 Drawing Sheets

(58) Field of Classification Search
USPC .............. 361/679.21–679.3, 679.55, 679.56
See application file for complete search history.

(56) References Cited

U.S. PATENT DOCUMENTS

| | | | |
|---|---|---|---|
| 9,772,657 B2* | 9/2017 | Takayanagi | G06F 1/1652 |
| 2004/0183958 A1* | 9/2004 | Akiyama | G02F 1/133305 |
| | | | 349/58 |
| 2008/0018631 A1 | 1/2008 | Hioki et al. | |
| 2012/0204453 A1* | 8/2012 | Jung | G09F 9/301 |
| | | | 40/517 |
| 2015/0089974 A1 | 4/2015 | Seo et al. | |
| 2015/0325804 A1* | 11/2015 | Lindblad | H01L 51/52 |
| | | | 313/511 |

OTHER PUBLICATIONS

International Search Report (English translation) and Written Opinion of International Application No. PCT/CN2016/076473, dated Jun. 15, 2016, 6 pages.
English translation of Box No. V of the Written Opinion for the International Searching Authority for International Application No. PCT/CN2016/076473, 2 pages.
First Office Action for Chinese Patent Application No. 201510172927.8, dated Mar. 21, 2017, 13 pages.

* cited by examiner

FLEXIBLE DISPLAY DEVICE

CROSS REFERENCE TO RELATED APPLICATIONS

This application is a Section 371 National Stage Application of International Application No. PCT/CN2016/076473, filed on 16 Mar. 2016, entitled "FLEXIBLE DISPLAY DEVICE", which claims priority to Chinese Application No. 201510172927.8, filed on 13 Apr. 2015, incorporated herein by reference in its entirety.

TECHNICAL FIELD

The present disclosure relates to the field of display technologies, and particularly, to a flexible display device.

BACKGROUND

Flexible displays have been more and more popular and widely used due to their advantages such as thin, flexible, and good mechanical properties.

When a flexible display screen is used as a touch screen, especially a large-sized touch screen, it is difficult to perform click and touch control operations on it due to its flexibility, thus, its application has been restricted.

SUMMARY

An object of embodiment of the invention is to provide a flexible display device, on which touch and control operations can be easily performed.

In order to achieve the above object, there is provided a flexible display device, which includes a flexible display screen, the flexible display device further includes a supporting structure configured for supporting the flexible display screen, the flexible display screen is fixedly connected with the supporting structure and fixed on a supporting surface of the supporting structure, and the supporting surface of the supporting structure is allowed to be selectively transformed into a planar surface or a curved surface.

Preferably, the supporting structure may include a plurality of supporting elements and each of the plurality of supporting elements has a sub-supporting surface such that the sub-supporting surfaces of the plurality of supporting elements jointly form the supporting surface, and two adjacent supporting elements are hinged with each other by a hinging device such that the supporting elements are rotatable about a hinging shaft of the hinging device.

Preferably, the supporting element has a supporting portion and a base portion formed underneath the supporting portion, a top surface of the supporting portion forms the sub-supporting surface of the supporting element, and a cross sectional area of the supporting portion gradually increases from top to bottom; the hinging device is disposed at a boundary between the supporting portion and the base portion, and in a condition of side surfaces of two adjacent base portions being engaged with each other, the top surfaces of two corresponding supporting portions lie in the same plane.

Preferably, in a condition of the supporting surface of the supporting structure being transformed into a planar surface, an included angle between side surfaces of two adjacent supporting portions may be in a range from 60 degrees to 80 degrees.

Preferably, for two adjacent supporting elements, the base portion of one supporting element may be provided with a protrusion while the base portion of the other supporting element is provided with a recess corresponding to the protrusion, and in the condition of the supporting surface of the supporting structure being transformed into a planar surface, each protrusion is located within a corresponding recess.

Preferably, a ratio between an area of the sub-supporting surface of the supporting element and an area of a bottom surface of a portion of the flexible display screen corresponding to and supported by the sub-supporting surface is in a range from 0.7 to 0.8.

Preferably, the plurality of supporting elements may be arranged sequentially in a predetermined direction, and a width of each supporting element is in a range from 3 mm to 5 mm.

Preferably, an elastic material may be disposed within a cavity jointly formed by the flexible display screen and the plurality of supporting elements.

Preferably, the flexible display device may further include a housing and a rotation shaft disposed within the housing, the rotation shaft is provided thereon with a drive circuit configured for driving the flexible display screen, one side of the flexible display screen is connected to the drive circuit; when the rotation shaft rotates about its axis, the flexible display screen and the supporting structure are allowed to be wrapped around the rotation shaft; and the housing is provided with an opening in its sidewall, and the flexible display screen and the supporting structure are allowed to extend out through the opening.

Preferably, the flexible display screen is a touch screen.

In the embodiment of the invention,

In embodiment of the invention, the flexible display screen and the supporting structure fixedly connected, the supporting surface of the supporting structure may be set to be planar or curved, such that the supporting structure and the flexible display screen may be curled or uncurled together. The supporting structure may support the flexible display screen so as to facilitate touch control and click operations performed on the flexible display screen, and thus application field of the flexible display screen may be expanded. Further, the flexible display device further include a housing and a shaft, such that when flexible display screen is used for exhibition or presentation, the flexible display screen may be pulled out through the opening of the housing, and when the exhibition or presentation is done, the flexible display screen and the supporting structure may be wrapped around the shaft and disposed within the housing, thereby facilitating storage and protection of the flexible display screen.

BRIEF DESCRIPTION OF THE DRAWINGS

The appended drawings, which form a part of the description, are provided to facilitate understanding of embodiment of the invention. The drawings and the embodiments of the invention should not be construed as a limitation to the invention, but to explain the concept thereof. In these drawings.

LIST OF REFERENCE NUMERALS

Figure 1:
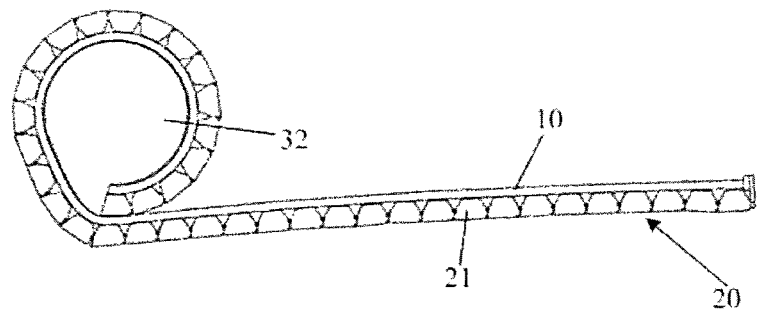
FIG. 1 is a schematic drawing showing a structure of a flexible display device according an embodiment of the invention.

10: flexible display screen
20: supporting structure
21: supporting element
21a: supporting portion
21b: base portion
22: hinging device
23: protrusion
24: recess
31: housing
32: rotation shaft
33: opening

DETAILED DESCRIPTION OF PREFERRED EMBODIMENTS

Embodiments of the invention will be described in detail in conjunction with the appended drawings. It should be understood that the embodiments are provided only to describe and explain the concept of the invention, rather than limiting the scope thereof.

To be noted, terms "up", "down", "above", "below/under" and the like used herein refer to directions shown in the drawings, especially the direction shown in FIG. 3 or 4.

An embodiment of the invention provides a display device including a flexible display screen. As shown in FIG. 1, the display device includes a flexible display screen 10 and a supporting structure 20 configured for supporting the flexible display screen 10. The flexible display screen 10 is fixedly connected with the supporting structure 20 such that the flexible display screen 10 is fixed on a supporting surface of the supporting structure 20. The supporting surface of the supporting structure 20 may be selectively transformed into a planar surface or a curved surface. In other words, the supporting surface may be transformed into a planar surface, or it may be transformed into a curved surface.

In this embodiment, since the flexible display screen 10 and the supporting structure 20 are fixedly connected with each other and the supporting surface of the supporting structure 20 may be selectively transformed into a planar surface or a curved surface, the supporting structure 20 may support the flexible display screen 10 and they may be curled or uncurled together, such that it will be convenient to perform touch control or click operations on the flexible display screen 10, and the field of application of the flexible display screen 10 may be enlarged.

Figure 2:
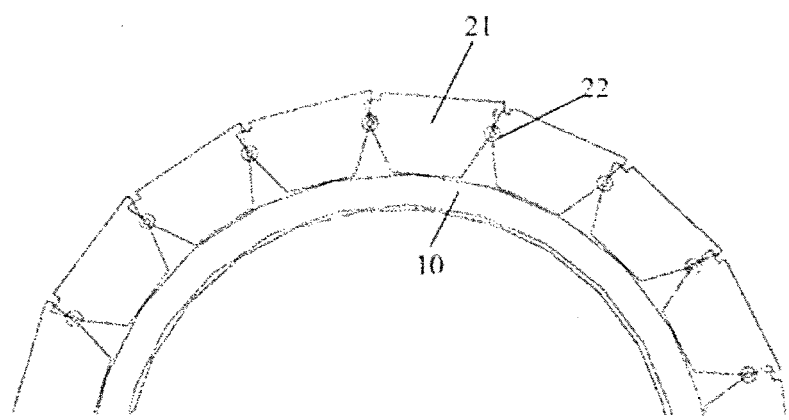
FIG. 2 is an illustrative partial enlarged view showing a curled portion of a flexible display screen and a supporting structure of the flexible display device according to the embodiment of the invention.
Figure 3:
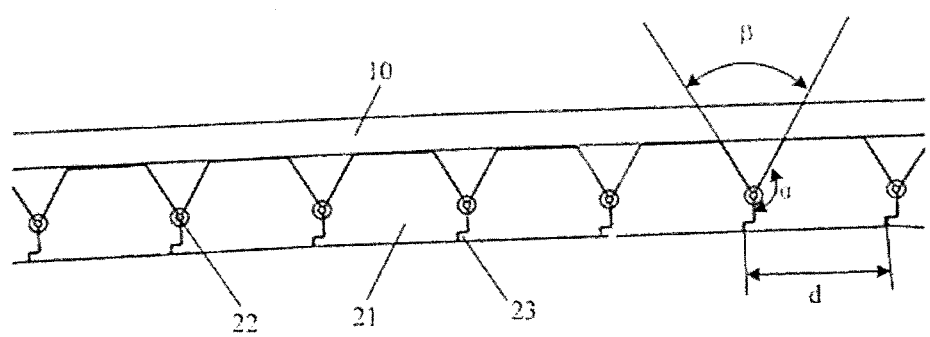
FIG. 3 is an illustrative partial enlarged view showing a uncurled portion of the flexible display screen and the supporting structure of the flexible display device according to the embodiment of the invention.

FIG. 2 shows a curled portion of a flexible display screen and a supporting structure of the flexible display device of FIG. 1, and FIG. 3 shows an uncurled portion of the flexible display screen and the supporting structure of the flexible display device of FIG. 1. As shown in FIGS. 2 and 3, the supporting structure 20 may include a plurality of supporting elements 21 and each of the supporting elements 21 has a sub-supporting surface such that sub-supporting surfaces of the plurality of supporting elements 21 jointly forms the supporting surface. Every two adjacent supporting elements 21 are hinged with each other by a hinging device 22, such that the two adjacent supporting elements 21 may be rotated around the hinging device 22 relative to each other, and thereby the flexible display screen 10 can be curved.

Figure 4:
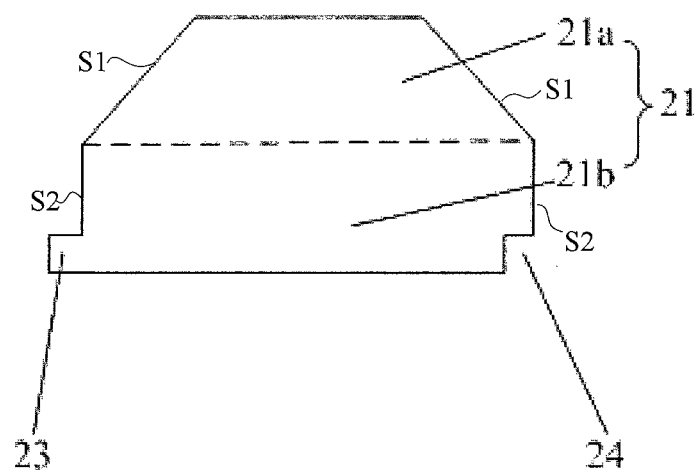
FIG. 4 is an illustrative cross-sectional view showing a single supporting element according to the embodiment of the invention.

An embodiment of the supporting element is shown in FIG. 4. It would be appreciated that, a length direction of the supporting element 21 is perpendicular to the plane of FIG. 4, and a width direction of the supporting element 21 is a horizontal direction shown in FIG. 4, and a height direction of the supporting element 21 is a vertical direction shown in FIG. 4. The supporting element 21 has a supporting portion 21a configured for supporting the flexible display screen and a base portion 2 lb formed underneath the supporting portion 21a. A top surface of the supporting portion 21a forms the sub-supporting surface of the supporting element 21, and a width of the supporting portion 21a gradually increases from the sub-supporting surface towards the base portion 21b; the hinging device 22 is arranged at a boundary between the supporting portion 21a and the base portion 2 lb; when side surfaces S2 of two adjacent base portions 21b are jointed to or engaged with each other, top surfaces (i.e, sub-supporting surfaces) of corresponding two supporting portions 21 lie in the same plane. Thus, when the side surfaces of the base portions 21b of every two adjacent the supporting elements 21 are engaged to one another, the sub-supporting surfaces of all the supporting elements 21 lie in the same plane, such that the flexible display screen 10 is uncurled to be planar. When two adjacent supporting elements 21 are rotated relative to each other about a hinging shaft of a corresponding hinging device 22 therebetween, a portion of the flexible display screen 10 supported by the two adjacent supporting elements 21 will be curved.

The hinging device 22 may have a shaft-sleeve structure, or it may have a hinge structure. The hinging device may have any possible structure as long as its two adjacent supporting elements 21 are pivotable relative to each other.

It can be understood that, when the supporting elements 21 rotate about the hinging shafts of the hinging devices 22 to curl or curve the flexible display screen, the surface of the flexible display screen 10 is tangential to the sub-supporting surface of each of the supporting elements 21. Therefore, in an embodiment of the invention, when the flexible display screen 10 and the supporting structure 20 are fixedly connected, an edge of the flexible display screen 10 may be fixedly connected with an edge of the supporting structure 20 (as shown in FIG. 1), or adhesive material may be provided at a central portion of the supporting surface 21 to connect the supporting surface 21 with the flexible display screen 10.

Specifically, in various embodiments of the invention, side surfaces of the supporting portion 21a may be planar surfaces or arc-shaped convex or concave surfaces, as long as cross section area of the supporting portion 21a gradually increases from top to bottom such that two adjacent supporting elements 21 may be rotated about the hinging device. To facilitate manufacturing of the supporting elements, in the embodiment of the invention, the side surface 51 of the supporting portion 21a is an inclined planar surface.

Specifically, in an exemplary embodiment, when the supporting surface of the supporting structure 20 is transformed into a planar surface, an included angle (for example, the angle β shown in FIG. 3) between two side surfaces of two adjacent supporting portions 21a facing each other is in a range from 60 degrees to 80 degrees. That is, for each of the supporting elements 21, an included angle (for example, the angle a shown in FIG. 3) between the side surface S1 of the supporting portion 21a and the side surface S2 of the base portion 21b is in a range from 140 degrees to 150 degrees, so as to avoid an overlarge cavity or space from being formed between two adjacent supporting portions 21a due to an overlarge included angle therebetween which leads to insufficient support for the flexible display screen, and to avoid a situation that the entire supporting structure 20 cannot be sufficiently curved or curled due to a undersized included angle between the two adjacent supporting portions 21a. In such a manner, supporting performance of the supporting structure 20 and curling performance of the supporting structure 20 may be improved.

In the embodiment shown in FIG. 4, the base portion 21b of the supporting elements 21 is provided with a protrusion 23 and a recess 24. When the supporting surface of the supporting structure 20 is adjusted into a planar surface, the protrusion 23 of the supporting element 21 is located within a corresponding recess 24 of an adjacent supporting element 21 located at one side of the supporting element 21, and the recess 24 of the supporting element 21 receives a corresponding protrusion 23 of another adjacent supporting element 21 located at the other side of the supporting element 21, such that the supporting elements 21 may be steadily held.

Specifically, the extent of the protrusion 23 in the horizontal direction of FIG. 4 is in a range from 0.5 mm to 1 mm. With such configuration, in the condition of the protrusion 23 being ensured to secure the adjacent supporting elements, the supporting element 21 may be expediently rotated about the hinging device.

In an embodiment, a ratio between an area of the sub-supporting surface of the supporting element 21 and an area of the base portion 21b of the supporting element 21 is in a range of 0.7~0.8. With such configuration, area of the supporting surface may be increased as much as possible and the supporting performance of the supporting structure 20 is increased, and at the same time, curling performance of the supporting structure 20 is improved.

Specifically, the plurality of supporting elements 21 are arranged sequentially along a predetermined direction (i.e., the width direction of the supporting element 21), and the width (d, as shown in FIG. 3, or a distance between two opposite side surface S2 of the supporting portion 21b of the supporting element 21) of each supporting element 21 is in a range from 3 mm to 5 mm, such that when the supporting structure 20 and the flexible display screen 10 are curled along the predetermined direction, the curling performance thereof may be improved, and manufacturing of the supporting elements 21 may be facilitated. The predetermined direction may be a length direction or a width direction of the flexible display screen 10.

The material for manufacturing the supporting elements 21 is not specially limited herein, and may be any hard material that can provide a rigid support for the flexible display screen 10. For example, the material may be a metallic, plastic or polymeric material. As shown in FIG. 1, when the supporting structure 20 and the flexible display screen 10 are curled, bottom surfaces of some of the base portions 21b of the supporting elements will contact the flexible display screen. In order to protect the flexible display screen 10 from being scraped by the supporting structure 20, edges of the base portions 21b that would contact the flexible display screen 10 may be rounded and smoothed.

Preferably, after the flexible display screen 10 is disposed on the supporting surface, an elastic material, such as rubber, silica gel or the like, may be disposed within the cavity formed between the flexible display screen 10 and two adjacent supporting elements 21. When the supporting surface of the supporting structure 20 is curled such that the flexible display screen 10 is curled, the elastic material is squeezed and compressed; and when the supporting structure 20 is uncurled such that the flexible display screen 10 is uncurled to be planar, the elastic material is restored to fill the cavity between the flexible display screen 10 and adjacent supporting portions 21a, so as to provide a certain support to the flexible display screen 10, and also to prevent the flexible display screen 10 from being clamped by side surfaces of two adjacent supporting portions 21a due to undersized included angle between the two adjacent supporting portions when the supporting structure 20 is curled. Specifically, when the elastic material is being squeezed, the included angle between two adjacent supporting portions 21a is not less than 15 degrees.

Figure 5:
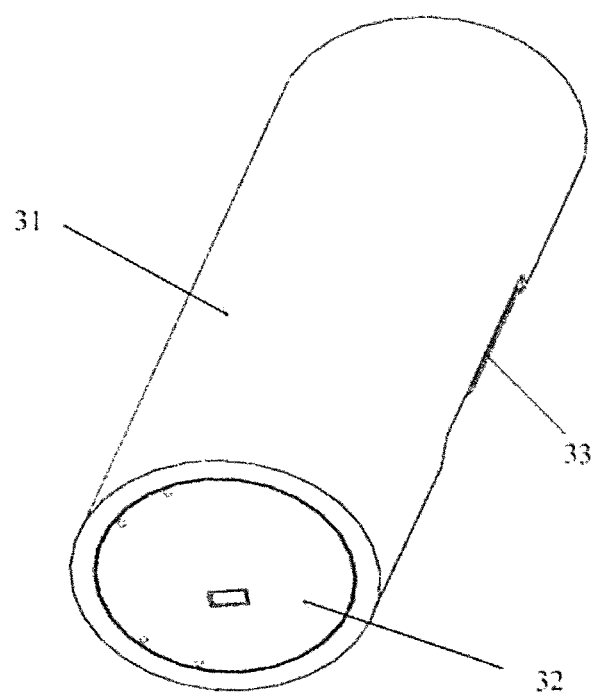
FIG. 5 is a schematic structural drawing showing a housing and a shaft of the flexible display device according the embodiment of the invention.

Further, the flexible display device may further include a housing 31 and a shaft 32 disposed within the housing 31 (as shown in FIG. 5), the shaft 32 is provided thereon with a drive circuit configured for driving the flexible display screen 10, and one side of the flexible display screen 10 is connected to the drive circuit. When the shaft 32 rotates about its axis, the flexible display screen 10 and the supporting structure 20 may be wrapped around the shaft 32. The housing 31 is provided with an opening 33 in its sidewall, such that the flexible display screen 10 and the supporting structure 20 may extend out through the opening 33.

The flexible display screen 10 may be a large-sized screen for exhibiting or presentation, and when it is used for exhibition or presentation, the flexible display screen 10 and the supporting structure 20 may be pulled out from the opening of the housing 31, and all the base portions 21b of the supporting elements 21 are jointed together such that the supporting surface of the supporting structure 20 is transformed into a planer surface, and thereby the flexible display screen is uncurled into a planar state. With the supporting of the supporting structure, touch control and click operations may be performed on the flexible display screen 10. After usage, the flexible display screen 10 and the supporting structure may be wrapped round the shaft 32 by rotating the shaft 32, such that the flexible display screen and the supporting structure are retracted into the housing, such that the flexible display device may be conveniently stored and prevented from being damaged.

The supporting structure 20 according to the embodiment of the invention may support the flexible display screen 10, such that touch control and click operations may be performed on the flexible display screen 10, and that is to say, the flexible display screen 10 in the embodiment of the invention may be a touch screen.

From the description of the flexible display device according to the embodiments of the invention set forth above, it can be seen that the flexible display screen and the supporting structure fixedly connected, the supporting surface of the supporting structure may be set to be planar or curved, such that the supporting structure and the flexible display screen may be curled or uncurled together. The supporting structure may support the flexible display screen so as to facilitate touch control and click operations performed on the flexible display screen, and thus application field of the flexible display screen may be expanded; further, the flexible display device further include a housing and a shaft, such that when flexible display screen is used for exhibition or presentation, the flexible display screen may be pulled out through the opening of the housing, and when the exhibition or presentation is done, the flexible display screen and the supporting structure may be wrapped around the shaft and disposed within the housing, thereby facilitating storage and protection of the flexible display screen.

It would be appreciated that the above embodiments are illustrative and provided only to describe the concept of the invention, and the scope of the invention is not limited thereto. Various changes or modifications may be made by an ordinary skilled in the art without departing from the principles and spirit of the disclosure, which changes or modifications shall also fall within the scope of the invention.

What is claimed is:

1. A flexible display device, comprising:
   a flexible display screen; and
   a supporting structure configured for supporting the flexible display screen,
   wherein the flexible display screen is fixed on a supporting surface of the supporting structure, and the supporting surface of the supporting structure configured such that the supporting structure is allowed to be selectively transformed into a planar surface or a curved surface;
   wherein the supporting structure comprises a plurality of supporting elements and each of the plurality of supporting elements has a sub-supporting surface such that the sub-supporting surfaces of the plurality of supporting elements jointly form the supporting surface, and two adjacent supporting elements are hinged with each other by a hinging device such that the two adjacent supporting elements are rotatable relative to each other about a hinging shaft of the hinging device;
   wherein the supporting element has a supporting portion for supporting the flexible display screen and a base portion formed underneath the supporting portion, a top surface of the supporting portion forms the sub-supporting surface of the supporting element, and a width of the supporting portion gradually increases from the sub-supporting surface towards the base portion; and
   wherein the hinging device is disposed at a boundary between the supporting portion and the base portion, and in a condition of side surfaces of two adjacent base portions being engaged with each other, the top surfaces of two corresponding supporting portions lie in the same plane.

2. The flexible display device according to claim 1, wherein in a condition of the supporting surface of the supporting structure being transformed into a planar surface, an included angle between side surfaces of two adjacent supporting portions facing each other is in a range from 60 degrees to 80 degrees.

3. The flexible display device according to claim 1, wherein the base portion of the supporting element is provided with a protrusion and a, and in the condition of the supporting surface of the supporting structure being transformed into a planar surface, the protrusion of the supporting element is located within a corresponding recess of an adjacent supporting element located at one side of the supporting element, and the recess of the supporting element receives a corresponding protrusion of another adjacent supporting element located at the other side of the supporting element.

4. The flexible display device according to claim 1, wherein a ratio between an area of the sub-supporting surface of the supporting element and an area of the base portion of the supporting element is in a range from 0.7 to 0.8.

5. The flexible display device according to claim 1, wherein the plurality of supporting elements are arranged sequentially in a predetermined direction, and a width of the base portion of each supporting element is in a range from 3 mm to 5 mm.

6. The flexible display device according to claim 1, wherein an elastic material is disposed within a cavity jointly formed between a bottom surface of the flexible display screen and two adjacent supporting elements.

7. The flexible display device according to claim 1, wherein the flexible display device further comprises a housing, a rotation shaft disposed within the housing, and a drive circuit provided on the rotation shaft and configured for driving the flexible display screen;
   wherein the flexible display screen and the supporting structure are allowed to be wrapped around the rotation shaft by rotating the rotation shaft; and
   wherein the housing is provided with an opening in its sidewall, and the flexible display screen and the supporting structure are allowed to extend out through the opening.

8. The flexible display device according to claim 1, wherein the flexible display screen is a touch screen.

9. The flexible display device according to claim 3, wherein a length of the protrusion is in a range from 0.5 mm to 1 mm.

10. The flexible display device according to claim 6, wherein the elastic material is configured such that an included angle between two side surfaces of two supporting portions of two adjacent supporting elements facing each other is larger than or equal to 15 degrees.

* * * * *